United States Patent
Abe

(10) Patent No.: US 10,923,787 B2
(45) Date of Patent: Feb. 16, 2021

(54) HEAT INSULATION SHEET, METHOD FOR PRODUCING SAME, AND SECONDARY BATTERY IN WHICH SAME IS USED

(71) Applicant: Panasonic Intellectual Property Management Co., Ltd., Osaka (JP)

(72) Inventor: Yuuichi Abe, Hokkaido (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 207 days.

(21) Appl. No.: 16/326,695

(22) PCT Filed: Oct. 11, 2017

(86) PCT No.: PCT/JP2017/036742
§ 371 (c)(1),
(2) Date: Feb. 19, 2019

(87) PCT Pub. No.: WO2018/110055
PCT Pub. Date: Jun. 21, 2018

(65) Prior Publication Data
US 2019/0190098 A1   Jun. 20, 2019

(30) Foreign Application Priority Data
Dec. 12, 2016 (JP) .............. 2016-239982 U

(51) Int. Cl.
*H01M 4/02* (2006.01)
*H01M 10/658* (2014.01)
(Continued)

(52) U.S. Cl.
CPC .......... *H01M 10/658* (2015.04); *B32B 27/12* (2013.01); *B32B 37/15* (2013.01); *D06C 25/00* (2013.01); *D06M 11/79* (2013.01); *D06N 3/0002* (2013.01); *H01M 2/10* (2013.01); *H01M 2/1094* (2013.01); *H01M 10/647* (2015.04);
(Continued)

(58) Field of Classification Search
CPC ....................................... H01M 4/02
See application file for complete search history.

(56) References Cited

U.S. PATENT DOCUMENTS

2014/0335398 A1   11/2014  Partin et al.
2016/0060808 A1*   3/2016  Oikawa ............... D06M 13/513
                                                        442/63

FOREIGN PATENT DOCUMENTS

JP   2001-277385   10/2001
JP   2002-265286   9/2002
JP   2011-136859   7/2011

OTHER PUBLICATIONS

International Search Report of PCT application No. PCT/JP2017/036742 dated Jan. 9, 2018.

* cited by examiner

*Primary Examiner* — Jacob B Marks
(74) *Attorney, Agent, or Firm* — McDermott Will and Emery LLP

(57) ABSTRACT

A heat insulation sheet includes a fiber sheet, a resin layer provided on a surface of an outer peripheral portion of the fiber sheet, and a silica xerogel disposed in spaces of the fiber sheet. The fiber sheet includes fibers forming spaces among the fibers. The resin layer is denser than the fiber sheet and made of thermoplastic resin. The silica xerogel is held in the plurality of fibers. This heat insulation sheet is excellent in adhesiveness, and is easily attached to a protective sheet or a frame to be fixed.

11 Claims, 3 Drawing Sheets

(51) Int. Cl.
 *B32B 27/12* (2006.01)
 *H01M 2/10* (2006.01)
 *B32B 37/15* (2006.01)
 *D06M 11/79* (2006.01)
 *D06C 25/00* (2006.01)
 *D06N 3/00* (2006.01)
 *H01M 10/647* (2014.01)

(52) U.S. Cl.
 CPC ..... *B32B 2307/304* (2013.01); *B32B 2457/10* (2013.01); *D06N 2209/065* (2013.01)

HEAT INSULATION SHEET, METHOD FOR PRODUCING SAME, AND SECONDARY BATTERY IN WHICH SAME IS USED

CROSS-REFERENCE TO RELATED APPLICATIONS

This application is a U.S. national stage application of the PCT international application No. PCT/JP2017/036742 filed on Oct. 11, 2017, which claims the benefit of foreign priority of Japanese patent application No. 2016-239982 filed on Dec. 12, 2016, the contents all of which are incorporated herein by reference.

TECHNICAL FIELD

The present invention relates to a heat insulation sheet used for heat countermeasure, a method for producing the heat insulation sheet, and a secondary battery including the heat insulation sheet.

BACKGROUND ART

Energy saving has recently been demanded. In order to achieve it, energy efficiency is improved by keeping a temperature of a device. Furthermore, for example, in a secondary battery in which a plurality of battery cells are combined, there is also a demand for heat insulation between battery cells in order not to affect adjacent battery cells when one of the battery cells is heated to a high temperature. In order to meet these demands, a heat insulation sheet having an excellent heat insulating effect has been required. A heat insulation sheet having a thermal conductivity lower than that of air by allowing a non-woven fabric to hold silica xerogel may be used.

A conventional heat insulation sheet similar to the above-mentioned heat insulation sheet is disclosed in, for example, PTL 1.

CITATION LIST

Patent Literature

PTL 1: Japanese Patent Laid-Open Publication No. 2011-136859

SUMMARY

A heat insulation sheet includes a fiber sheet, a resin layer provided on a surface of an outer peripheral portion of the fiber sheet, and a silica xerogel disposed in spaces of the fiber sheet. The fiber sheet includes fibers forming spaces among the fibers. The resin layer is denser than the fiber sheet and made of thermoplastic resin. The silica xerogel is held in the plurality of fibers.

This heat insulation sheet is excellent in adhesiveness, and is easily attached to a protective sheet or a frame to be fixed.

DETAIL DESCRIPTION OF PREFERRED EMBODIMENT

Figure 1:
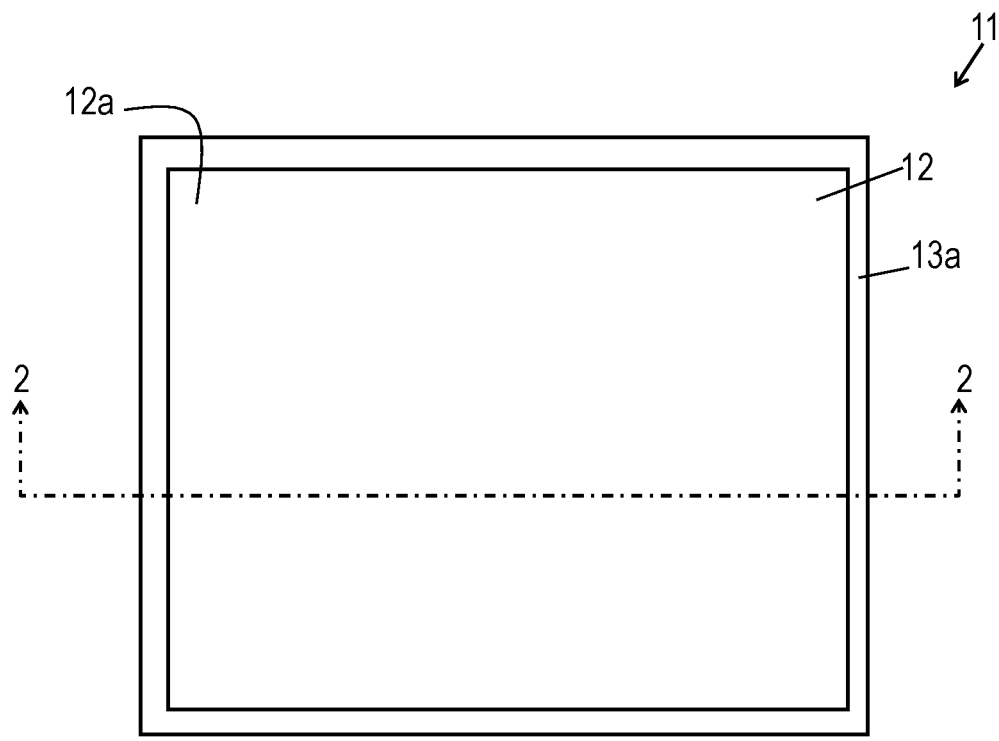
FIG. 1 is a top view of a heat insulation sheet in accordance with an exemplary embodiment.
Figure 2:
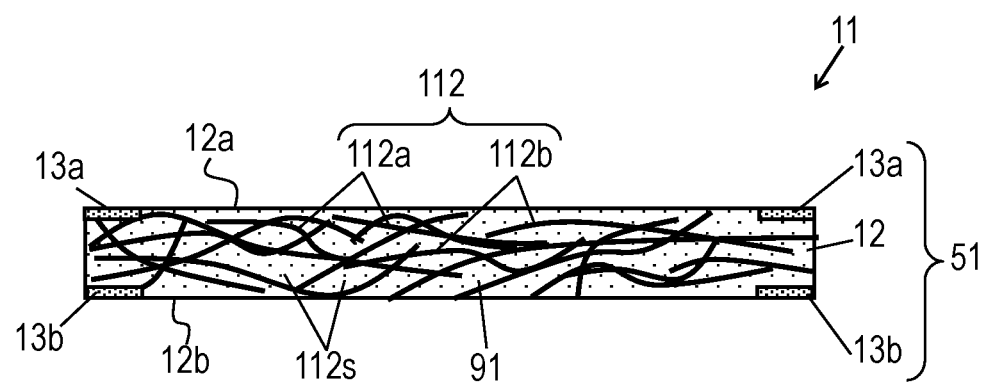
FIG. 2 is a sectional view of the heat insulation sheet along line 2-2 shown in FIG. 1.

FIG. 1 is a top view of heat insulation sheet 11 in accordance with an exemplary embodiment. FIG. 2 is a sectional view of heat insulation sheet 11 along line 2-2 shown in FIG. 1.

Heat insulation sheet 11 includes fiber sheet 12 having spaces 112s inside thereof, dense resin layers 13a and 13b provided on surfaces 12a and 12b of outer peripheral portions of fiber sheet 12, and silica xerogel 91 held in spaces 112s of fiber sheet 12. Heat insulation sheet 11 has a thickness of about 1 mm. Fiber sheet 12 includes fibers 112 forming spaces 112s therein. Fibers 112 includes glass fibers having an average fiber diameter of about 10 μm. A ratio of a total volume of spaces 112s to a volume of fiber sheet 12 is about 90%. Since both glass fibers and silica xerogel are flame retardant, heat insulation sheet 11 is flame retardant accordingly. A glass fiber is relatively short. Therefore, when relatively large strength is required, fibers 112 of fiber sheet 12 may contain fibers 112a made of glass fibers and fibers 112b made of, e.g. such as polyethylene terephthalate, which are to be mixed with fibers 112a and are longer than fiber 112a. An average fiber length of fibers 112b is larger than that of fiber 112a. Fibers 112b may have lower flame retardant property than fiber 112a. In this case, fiber sheet 12 may be formed by mixing fibers 112b with fibers 112a such that the flame retardant property of fibers 112a is not affected. Thus, heat insulation sheet 11 having flame retardant property can be obtained. When fibers 112b having a long fiber length is mixed with flame retardant fibers 112a to obtain fiber sheet 12 as a non-woven fabric, the ratio of fibers 112b in fibers 112 of fiber sheet 12 is preferably equal to or more than 30% and is preferably equal to or smaller than 70% by weight. This configuration provides fiber sheet 12 with excellent flame retardant property and strength. In accordance with the embodiment, fiber 112a is made of glass fiber, but may be made of, e.g. carbon fiber having flame retardant property, providing the same effect used.

Spaces 112s inside the fiber sheet 12 are filled with silica xerogel 91. Since silica xerogel 91 has nano-size spaces inside thereof, the thermal conductivity of heat insulation sheet 11 ranges from 0.018 to 0.024 W/m·K, which is smaller than the thermal conductivity of air. Silica xerogel 91 is a xerogel in a broad sense in which a gel is in a dry state, and can be obtained not only by ordinary drying but also by a method, such as supercritical drying and lyophilization.

Resin layers 13a and 13b are provided on surfaces 12a and 12b of an outer peripheral portion of fiber sheet 12 opposite to each other, respectively. Each of resin layers 13a and 13b has a thickness of about 0.03 mm. In accordance with the embodiment, resin layers 13a and 13b are provided only at the outer peripheral portion of fiber sheet 12, but are not provided in the inner side portion surrounded by the outer peripheral portion. The surfaces of resin layers 13a and 13b are dense, and denser than fiber sheet 12. Herein, the state in which surface is dense means that silica xerogel 91 itself or a gel or liquid, such as a sol for forming xerogel 91 is disabled to pass through. In accordance with the embodiment, resin layers 13a and 13b disable silica xerogel 91 itself or liquid, such as a sol for forming xerogel 91, to permeate and pass through resin layers 13a and 13b. Resin layers 13a and 13b is made of thermoplastic resin, such as polybutylene terephthalate (hereinafter, referred to as "PBT"), and permeates into surfaces 12a and 12b of fiber sheet 12.

When protective sheets are attached to heat insulation sheet 11, the protective sheets are attached to resin layers 13a and 13b. Frames may be fixed to resin layers 13a and 13b. For example, when the frames are molded with thermoplastic resin, heat insulation sheet 11 is placed and molded in a mold. Thus, frames having heat insulation sheet 11 fixed to the inner side between the frames can be obtained. In this case, resin layers 13a and 13b are preferably made of the same material as molding the frame, or a material having a melting point close to a melting point of the resin for molding the frame. Thus, heat insulation sheet 11 is strongly joined to the frame.

Since the conventional heat insulation sheet mentioned above has poor adhesiveness to allow silica xerogel to be easily detached. Accordingly, a protective sheet is needed. Furthermore, when the heat insulation sheet is disposed between battery cells, displacement of the sheet easily occurs. Therefore, a member for fixation is necessary, but fixation is difficult due to poor adhesiveness.

Heat insulation sheet 11 in accordance with the embodiment is strongly bonded to protective sheets or frames as mentioned above.

When a resin film having a window frame shape is placed, heated, and pressed onto surfaces 12a and 12b of fiber sheet 12, resin layers 13a and 13b may be provided on a part of surfaces 12a and 12b of fiber sheet 12. Alternatively, when a melted resin is placed on surfaces 12a and 12b of fiber sheet 12 and pressure is applied thereto, thus allowing the resin to permeate the fiber sheet, resin layers 13a and 13b are formed. Resin layers 13a and 13b adhere to fiber 112 of the fiber sheet.

In the case that resin layers 13a and 13b are excessively thin, bonding strength to the protective sheet and the frame becomes weak. In the case that resin layers 13a and 13b are excessively thick, a region of fiber sheet 12 between resin layers 13a and 13b becomes narrow, and silica xerogel 91 does not easily enter the region. Therefore, the thickness of resin layers 13a and 13b is preferably equal to or larger than 2% of the thickness of fiber sheet 12 and equal to or smaller than or 20% of the thickness of fiber sheet 12.

The area of resin layers 13a and 13b is preferably equal to or larger than 2% of the area of surfaces 12a and 12b of fiber sheet 12 and is preferably equal to or smaller than 20% of the area of surfaces 12a and 12b of fiber sheet 12. Resin layers 13a and 13b having the area less than 2% may not sufficiently provide an effect of resin layers 13a and 13b. On the contrary, when the area larger than 20% may provide a problem in flame retardant property.

In heat insulation sheet 11 in which fiber sheet 12 is impregnated with silica xerogel 91, since silica xerogel 91 is exposed to the surfaces of heat insulation sheet 11, it is difficult to provide adhesive agent on the surfaces. In heat insulation sheet 11 in accordance with the embodiment, even in the case that the surface of heat insulation sheet 11 is not covered with a protective sheet, resin layers 13a and 13b with an adhesive agent provide fixation or temporary fixation to other components, and improve heat insulation property per thickness.

A method for producing heat insulation sheet 11 in accordance with the exemplary embodiment will be described below.

First, fiber sheet 12 including fibers 112 as glass fibers and having a thickness of about 1 mm is prepared. Resin films made of PBT having a thickness of about 0.03 mm are placed on surfaces 12a and 12b of fiber sheet 12. Each resin film has a rectangular opening and have a window frame shape.

Next, a pressure plate with a temperature at which PBT as a material of the resin films is melted is pressed against the resin films and pressurized. Therefore, the resin films are softened or melted, and pushed into fiber sheet 12 thorough surfaces 12a and 12b. After that, the resin films and fiber sheet 12 are returned to a room temperature. This process provides dense resin layers 13a and 13b on surfaces 12a and 12b only at an outer peripheral portion of fiber sheet 12. Fiber sheet 12 and resin layers 13a and 13b constitute base material sheet 51.

Next, fiber sheet 12 of base material sheet 51 is immersed in, for example, a sol obtained by adding hydrochloric acid with sodium silicate aqueous solution so as to impregnate internal spaces 112s of fiber sheet 12 with the sol. The sol enters internal spaces 112s of fiber sheet 12 in a portion that is not provided with resin layers 13a and 13b. On the surfaces of resin layers 13a and 13b, xerogel is hardly attached. Even if a part of the xerogel is attached to the surfaces of resin layers 13a and 13b, it can be easily removed. The sol is gelled, made hydrophobic, and dried, and thereby, allows internal spaces 112s of fiber sheet 12 to be filled with silica xerogel 91. This process provides heat insulation sheet 11 including dense resin layers 13a and 13b provided on surfaces 12a and 12b of the outer peripheral portions of fiber sheet 12 such that silica xerogel 91 fills internal spaces 112s of fiber sheet 12.

Figure 3:
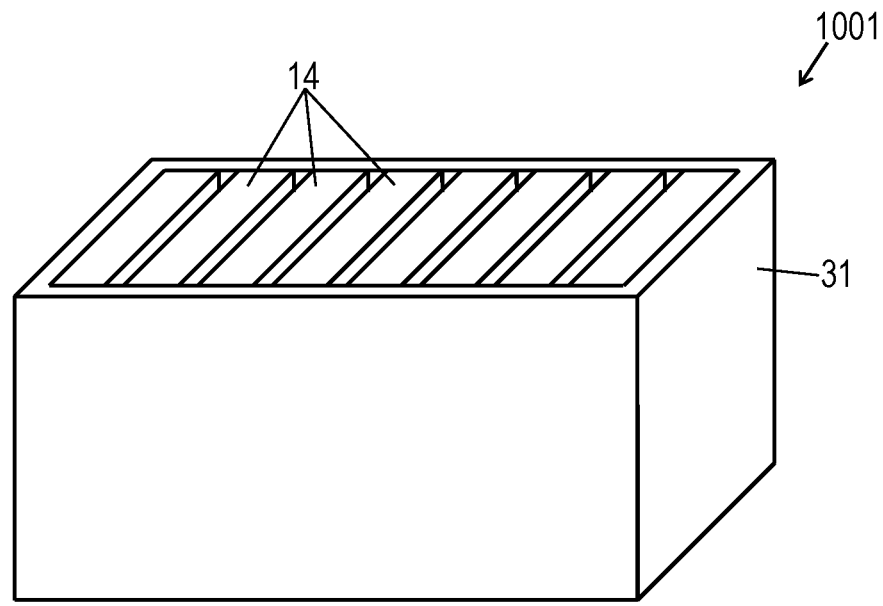
FIG. 3 is a perspective view of a secondary battery including the heat insulation sheet in accordance with the embodiment.
Figure 4:
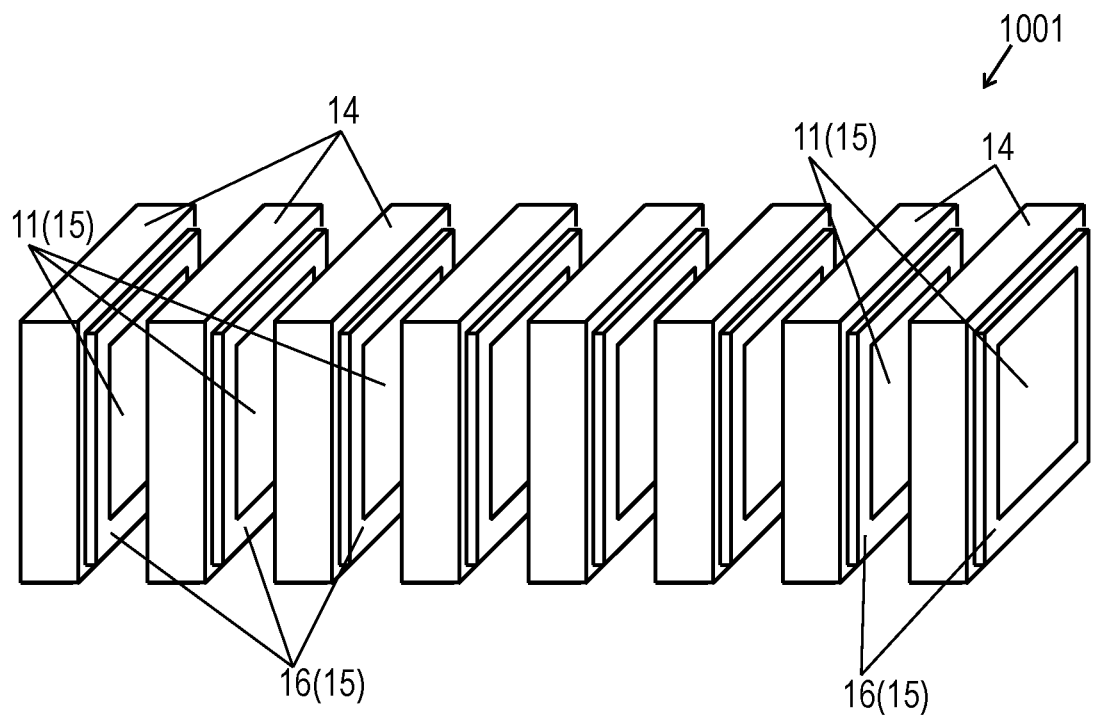
FIG. 4 is an exploded perspective view of the secondary battery in accordance with the embodiment.
Figure 5:
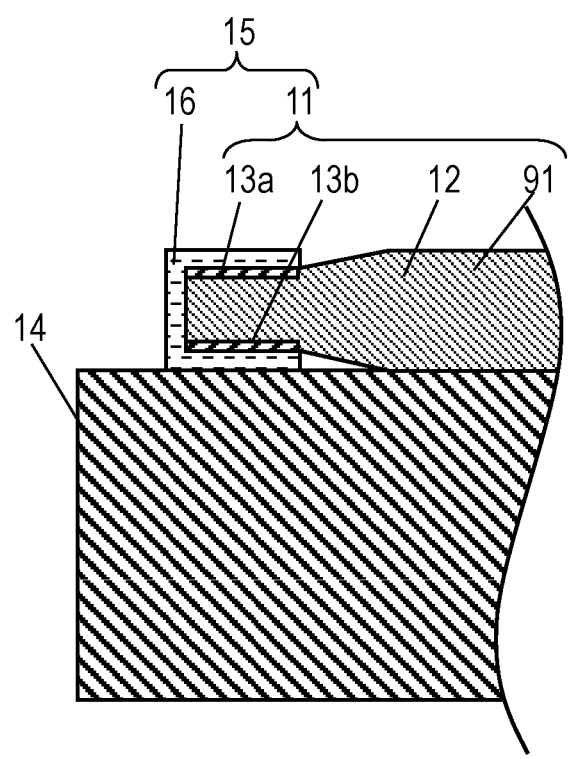
FIG. 5 is an enlarged sectional view of the secondary battery in accordance with the embodiment.

A secondary battery including heat insulation sheet 11 will be described below. FIG. 3 is a perspective view of secondary battery 1001 including heat insulation sheet 11 in accordance with the embodiment. FIG. 4 is an exploded perspective view of secondary battery 1001. FIG. 5 is an enlarged sectional view of secondary battery 1001.

Secondary battery 1001 includes battery cells 14, separators 15 each disposed between battery cells 14, and housing 31 that accommodates battery cells 14 and separators 15 therein. FIG. 4 does not show housing 31. Separators 15 contact adjacent battery cells 14. Each separator 15 includes frame 16 and heat insulation sheet 11 disposed in frame 16. Heat insulation sheet 11 includes fiber sheet 12 having spaces inside thereof, dense resin layers 13a and 13b provided on surfaces of only the outer peripheral portion of fiber sheet 12, and silica xerogel 91 held in the spaces of fiber sheet 12. Heat insulation sheet 11 has a thickness of about 1 mm. Resin layers 13a and 13b are made of PBT, and permeate surfaces 12a and 12b of fiber sheet 12. Frame 16 is formed by molding a thermoplastic resin, such as PBT. Heat insulation sheet 11 is disposed in a predetermined position of a mold, and molded. Frame 16 is bonded to resin layers 13a and 13b of heat insulation sheet 11 to thus form separator 15. Since frame 16 and resin layers 13a and 13b are made of the same material, frame 16 is securely bonded to resin layers 13a and 13b. Frame 16 may be made of material different from that of resin layers 13a and 13b, but is preferably made of a material having a melting point close to that of resin layers 13a and 13b. Heat insulation sheet 11 that is not covered with a protective sheet is disposed between battery cells 14, providing secondary battery 1001 with a small size and excellent reliability.

Battery cells 14 are arranged between separators 15, and fixed to the inside of housing 31, thereby providing insulation property between battery cells 14. Even if a temperature of one battery cell 14 among battery cells 14 rises, heat insulation sheet 11 of separator 15 prevents conduction of heat generated by the high-temperature battery cell 14. Thus, secondary battery 1001 having high reliability can be obtained in which adverse influence to the other battery cells 14 is suppressed.

Even in the case that the heat insulation sheet has excellent flame retardant property, if a protective sheet that covers the heat insulation sheet easily burns, the flame retardant property as a whole becomes poor. However, heat insulation sheet 11 in accordance with the embodiment can be fixed or temporarily fixed to another component even without a protective sheet. Resin layers 13a and 13b having the area smaller than 20% of the area of heat insulation sheet 11 provides sufficient flame retardant property.

An adhesive agent may be applied or attached to a portion of resin layers 13a and 13b of heat insulation sheet 11, and may be directly attached to battery cell 14. In this case, resin layers 13a and 13b may not necessarily be provided to an entire outer peripheral portion of heat insulation sheet 11, and may be temporarily fixed with only one side or facing two sides. When heat insulation sheet 11 is disposed between battery cells 14, a force is often applied to battery cell 14 finally and fixed to the inside of housing 31. Heat insulation sheet 11 may be temporarily fixed so as not to cause displacement at the time of assemble. Therefore, resin layers 13a and 13b may not be provided to an entire outer peripheral portion of heat insulation sheet 11, and may be temporarily fixed to only one side or facing two sides.

REFERENCE MARKS IN THE DRAWINGS 11 heat insulation sheet
12 fiber sheet
13a, 13b resin layer
14 battery cell
15 separator
16 frame
31 housing

The invention claimed is:

1. A heat insulation sheet comprising:
a fiber sheet including fibers forming spaces among the fibers;
a resin layer provided on a surface of an outer peripheral portion of the fiber sheet, the resin layer being denser than the fiber sheet and made of thermoplastic resin; and
a silica xerogel disposed in the spaces of the fiber sheet to be held in the plurality of fibers.

2. The heat insulation sheet of claim 1, wherein a thickness of the resin layer is equal to or larger than 2% of a thickness of the fiber sheet and is equal to or smaller than 20% of the thickness of the fiber sheet.

3. The heat insulation sheet of claim 1, wherein the resin layer disables liquid to pass through the resin layer.

4. A method for producing a heat insulation sheet, comprising:
preparing a base material sheet including:
a fiber sheet including fibers forming spaces among the fibers, and
a resin layer provided on a surface of an outer peripheral portion of the fiber sheet, the resin layer being denser than the fiber sheet and made of thermoplastic resin; and
obtaining a heat insulation sheet by impregnating the spaces of the fiber sheet with xerogel.

5. The method of claim 4, wherein said preparing the base material sheet comprises heating and pressing the base material sheet at a temperature at which the resin layer is softened so as to form the resin layer on the surface of the outer peripheral portion of the fiber sheet.

6. The method of claim 5, wherein said preparing the base material sheet comprises heating and pressing the base material sheet at a temperature at which the resin layer is melted so as to form the resin layer on the surface of the outer peripheral portion of the fiber sheet.

7. The method of claim 4, wherein said obtaining the heat insulation sheet comprises immersing the base material sheet in sol to impregnate the spaces of the fiber sheet with the xerogel.

8. The method of claim 7, wherein the resin layer disables the sol to pass through the resin layer.

9. A secondary battery comprising:
a plurality of battery cells; and
a separator disposed between the plurality of battery cells,
wherein the separator includes a heat insulation sheet and a frame fixed to an outer peripheral portion of the heat insulation sheet, and
wherein the heat insulation sheet includes:
a fiber sheet including fibers forming spaces among the fibers;
a resin layer provided on a surface of the outer peripheral portion of the fiber sheet and fixed to the frame, the resin layer being denser than the fiber sheet and made of thermoplastic resin; and
silica xerogel disposed in the spaces of the fiber sheet to be held in the plurality of fibers.

10. The secondary battery of claim 9, further comprising a housing that accommodates and fixes the plurality of battery cells and the separator.

11. A secondary battery comprising:
a plurality of battery cells;
a plurality of heat insulation sheets between the plurality of battery cells, the plurality of heat insulation sheets including silica gel having nano-sized spaces therein for blocking heat transfer between the plurality of battery cells;
a housing fixing the plurality of battery cells and the plurality of heat insulation sheets; and
a plurality of adhesive agents each provided respective one of the plurality of battery cells and respective one of the plurality of heat insulation sheets.

* * * * *